(12) United States Patent
Venugopalan et al.

(10) Patent No.: US 10,740,859 B2
(45) Date of Patent: Aug. 11, 2020

(54) METHOD AND SYSTEM FOR ON-BOARD DETECTION OF SPEEDING OF A VEHICLE AND PAYMENT OF AN ASSOCIATED FINE

(71) Applicant: MasterCard Asia/Pacific Pte Ltd, Singapore (SG)

(72) Inventors: Vijin Venugopalan, Singapore (SG); Benjamin Charles Gilbey, Singapore (SG); Veronica Kuoh, Singapore (SG)

(73) Assignee: Mastercard International Incorporated, Purchase, NY (US)

( * ) Notice: Subject to any disclaimer, the term of this patent is extended or adjusted under 35 U.S.C. 154(b) by 557 days.

(21) Appl. No.: 15/581,560

(22) Filed: Apr. 28, 2017

(65) Prior Publication Data
US 2017/0323409 A1 Nov. 9, 2017

(30) Foreign Application Priority Data
May 9, 2016 (SG) .............................. 10201603664T

(51) Int. Cl.
*G06Q 20/14* (2012.01)
*G06Q 50/26* (2012.01)
(Continued)

(52) U.S. Cl.
CPC .......... *G06Q 50/26* (2013.01); *G01C 21/3697* (2013.01); *G01S 19/52* (2013.01); *G06Q 20/14* (2013.01); *G01S 19/42* (2013.01)

(58) Field of Classification Search
CPC ............................... G06Q 20/14; G06Q 50/26
(Continued)

(56) References Cited

U.S. PATENT DOCUMENTS 6,163,277 A * 12/2000 Gehlot ................... G08G 1/052
340/539.1
6,462,675 B1 * 10/2002 Humphrey ............. G08G 1/052
340/441

(Continued)

FOREIGN PATENT DOCUMENTS

JP        2002133043 A  *  5/2002

OTHER PUBLICATIONS

"Wallets-on-wheels—Using vehicle's identity for secure mobile money." Authors: Rebecca Coneland and Noel Crespi. 2013 17th International Conference on Intelligence in Next Generation Networks (ICIN). pp. 102-109. Publication Date: Oct. 1, 2013. (Year: 2013).*

*Primary Examiner* — Sara C Hamilton
(74) *Attorney, Agent, or Firm* — Buckley, Maschoff & Talwalkar LLC

(57) ABSTRACT

A method for vehicle speeding self-detection and payment of an associated fine, the method including: a) in an on-board processing device, determining a speed indication indicative of the speed of the vehicle operated by a user; b) determining a speed limit indication indicative of a speed limit associated with a location of the vehicle with respect to a road network; c) determining if the speed of the vehicle exceeds the speed limit using the speed indication and the speed limit indication; d) in response to determining that the speed limit has been exceeded, determining a payment amount indicative of a discounted fine for exceeding the speed limit; and, e) causing the payment amount to be paid from an account of the user.

14 Claims, 10 Drawing Sheets

(51) Int. Cl.
  *G01C 21/36* (2006.01)
  *G01S 19/52* (2010.01)
  *G01S 19/42* (2010.01)

(58) Field of Classification Search
  USPC .......................................................... 705/35
  See application file for complete search history.

(56) References Cited

U.S. PATENT DOCUMENTS

| | | | |
|---|---|---|---|
| 8,742,950 B2* | 6/2014 | Schunder | G07C 5/008 340/936 |
| 9,355,423 B1* | 5/2016 | Slusar | G06Q 40/08 |
| 9,390,451 B1* | 7/2016 | Slusar | G06Q 40/04 |
| 10,096,067 B1* | 10/2018 | Slusar | G06Q 40/08 |
| 2002/0128000 A1* | 9/2002 | do Nascimento, Jr. | H04W 4/12 455/414.1 |
| 2002/0173881 A1* | 11/2002 | Lash | B60K 31/0058 701/1 |
| 2005/0137757 A1* | 6/2005 | Phelan | G01M 17/00 701/1 |
| 2005/0264404 A1* | 12/2005 | Franczyk | G08G 1/096716 340/441 |
| 2007/0216521 A1* | 9/2007 | Guensler | G08G 1/0104 340/439 |
| 2010/0131304 A1* | 5/2010 | Collopy | G06Q 30/0224 705/4 |
| 2010/0134267 A1* | 6/2010 | Lin | B60K 31/18 340/441 |
| 2013/0006674 A1* | 1/2013 | Bowne | H04W 4/40 705/4 |
| 2013/0046510 A1* | 2/2013 | Bowne | G06Q 10/0639 702/187 |
| 2013/0073112 A1* | 3/2013 | Phelan | G06Q 40/00 701/1 |
| 2013/0076906 A1* | 3/2013 | Rothschild | G08G 1/00 348/148 |
| 2013/0151412 A1* | 6/2013 | Spahl | G06Q 20/40 705/44 |
| 2015/0243165 A1* | 8/2015 | Elsheemy | B60R 25/00 340/906 |
| 2016/0042644 A1* | 2/2016 | Velusamy | H04W 4/70 340/435 |
| 2016/0055686 A1* | 2/2016 | Ukai | G07C 5/008 701/31.5 |
| 2016/0144713 A1* | 5/2016 | Verheijen | B60R 16/0236 701/123 |
| 2016/0232785 A1* | 8/2016 | Wang | G08G 1/012 |
| 2016/0347241 A1* | 12/2016 | Gralto | B60W 40/105 |

\* cited by examiner

METHOD AND SYSTEM FOR ON-BOARD DETECTION OF SPEEDING OF A VEHICLE AND PAYMENT OF AN ASSOCIATED FINE

CROSS-REFERENCE TO RELATED APPLICATION

This application is a U.S. National Stage filing under 35 U.S.C. § 119, based on and claiming benefit of and priority to SG Patent Application No. 10201603664T filed May 9, 2016.

BACKGROUND OF THE INVENTION

The present invention relates to a method and system for on-board detection of speeding of a vehicle and payment of an associated fine.

DESCRIPTION OF THE PRIOR ART

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

Speed limits exist and are enforced on roads in countries all around the world for the safety of all road users. Typically, penalties such as a fine are imposed for speeding offences so as to deter road users from exceeding the speed limit in a given area.

Speed detection and the enforcement and administration of speed limits is costly and time consuming, both for the government agencies that are responsible for speeding management, and for the road users who commit the speeding offences.

For example, in regard to speed detection, various types of equipment are required to be purchased, installed, maintained and monitored, each of which has an associated expense for the government agency. Examples of equipment that is currently deployed by law enforcement officers such as police and the like, include fixed and mobile speed cameras, handheld lasers (e.g. Light detection and ranging (LIDAR)) and dash mounted radar units used in police vehicles.

In addition to the equipment that is currently used to detect a vehicle's speed, often law enforcement officers are required to be physically present in the field in order to operate the devices. This adds further labour cost to the process as well as requiring significant police resources to manage.

After a speeding offense has occurred, traffic infringement notices (e.g. speeding fines) are generated and issued to the registered owner of the motor vehicle, typically via mail. This requires administrative effort and furthermore if the fine is not paid in a timely manner then further effort is required to issue reminders, further penalties or other actions that need to be performed in order to chase up the fine and payment thereof.

It is against this background, and the problems and difficulties associated therewith, that the present invention has been developed.

SUMMARY OF THE PRESENT INVENTION

In a first aspect, there is provided a method of on-board detection of speeding of a vehicle and payment of an associated fine, the method including: in an on-board processing device, determining a speed indication indicative of the speed of the vehicle operated by a user; determining a speed limit indication indicative of a speed limit associated with a location of the vehicle with respect to a road network; determining if the speed of the vehicle exceeds the speed limit using the speed indication and the speed limit indication; in response to determining that the speed limit has been exceeded, determining payment information at least partially indicative of a payment amount representing a discounted fine for exceeding the speed limit; determining user account information associated with an account of the user; and, providing the user account information and payment information to a payment processing system to thereby cause the discounted fine to be paid from the user account.

Preferably, the speed indication is determined using location information derived from a positioning system, the positioning system being the Global Positioning System (GPS) and the on-board processing device including a GPS receiver. The on-board processing device can be either a user client device or a vehicle processing device. The user client device can preferably receive the speed limit indication from a merchant processing device via a communications network.

The method can further include, in the user client device: determining location information indicative of the location of the vehicle; providing an indication of the location information to the merchant processing device; the merchant processing device being responsive to the location information to determine road network information based on the location information; and, receiving an indication of the road network information from the merchant processing device. Preferably, the road network information is at least partially indicative of at least one of a road network map and a speed limit indication.

The method can also further include, in the user client device, in response to determining that the speed limit has been exceeded, providing a speeding indication to the merchant processing device. The merchant processing device can be: receiving the speeding indication from the user client device; using the speeding indication to determine: a speeding offence at least partially based on an amount by which the vehicle speed exceeds the speed limit; and, a regulatory fine at least partially in accordance with the speeding offence; and, determining the payment amount representing the discounted fine, the payment amount being an amount less than the regulatory fine.

The method can also further include, in the merchant processing device: retrieving the account information associated with the user account from the user client device; providing the account information and payment information to the payment processing system to thereby cause the discounted fine to be paid from the user account; generating a notification that the user has been fined; and, providing the notification to the user client device.

Preferably, the user client device is responsive to receiving the notification to: generate a representation of the notification; and, cause the representation to be displayed to the user. The user account is also preferably associated with a digital wallet component installed on the user client device, the user account being pre-authenticated with the payment processing system so that the merchant processing device is able to cause the discounted fine to be paid from the user account without further authentication.

It is preferable that the on-board processing device is a user client device that is: initially paired with a vehicle processing device by the user; and, subsequently paired with the vehicle processing device automatically in response to vehicle ignition, the pairing to confirm that the user is operating the vehicle. The user client device can be paired with the vehicle processing device using a wireless communication protocol like Bluetooth.

The method can also include generating a notification indicative of a warning that the user has exceeded the speed limit; and, in the on-board processing device: generating a representation of the notification; and, displaying the representation to the user. The notification can be in the form of an audible warning provided to the user.

In a second aspect, there is provided a system for on-board detection of speeding of a vehicle and payment of an associated fine, the system including: an on-board processing device for: determining a speed indication indicative of the speed of the vehicle operated by a user; and, one or more electronic processing devices for: determining a speed limit indication indicative of a speed limit associated with a location of the vehicle with respect to a road network; determining if the speed of the vehicle exceeds the speed limit using the speed indication and the speed limit indication; in response to determining that the speed limit has been exceeded, determining a payment amount indicative of a discounted fine for exceeding the speed limit; and, causing the payment amount to be paid from an account of the user.

Preferably, the on-board processing device includes a GPS receiver for determining location information used to calculate the speed of the vehicle. The on-board processing device can be a user client device. A digital wallet component can be installed on the user client device, the digital wallet component storing account information being associated with the user account.

It is preferable that the one or more electronic processing devices includes one or more of: the on-board processing device; and a merchant processing device.

In another aspect, there is provided a system for on-board detection of speeding of a vehicle and payment of an associated fine, the system including: a user client device located on-board the vehicle for: determining a speed indication indicative of the speed of the vehicle operated by a user using location information derived from a positioning system; retrieving a speed limit indication indicative of a speed limit from a merchant server via a communications network, the speed limit associated with a location of the vehicle with respect to a road network; determining if the speed of the vehicle exceeds the speed limit using the speed indication and the speed limit indication; and, in response to determining that the speed limit has been exceeded, providing a speeding indication to the merchant server; and, a merchant server for: receiving the speeding indication from the user client device; using the speeding indication to determine: a speeding offence at least partially based on an amount by which the vehicle speed exceeds the speed limit; and, a regulatory fine at least partially in accordance with the speeding offence; and, determining payment information indicative of a payment amount representing a discounted fine being an amount less than the regulatory fine; retrieving account information associated with an account of the user from a digital wallet component installed on the user client device; and, providing the account information and payment information to a payment processing system to thereby cause the discounted fine to be paid from the user account.

It will be appreciated that the broad forms of the invention and their respective features can be used in conjunction, interchangeably and/or independently, and reference to separate broad forms in not intended to be limiting.

BRIEF DESCRIPTION OF THE DRAWINGS

A non-limiting example of the present invention will now be described with reference to the accompanying drawings, in which.

DETAILED DESCRIPTION OF THE PREFERRED EMBODIMENTS

Figure 1:
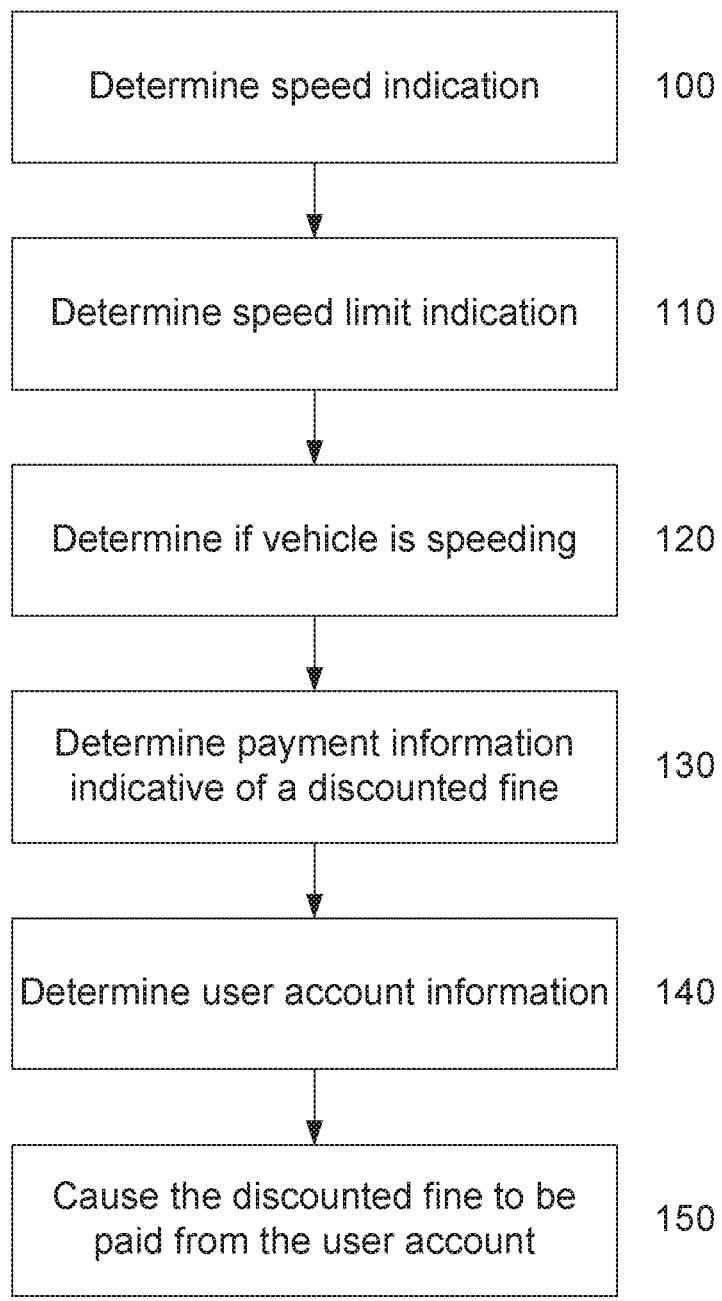
FIG. 1 is a flow chart of an example of a method of vehicle speeding self-detection and payment of an associated fine.

An example of a method of vehicle speeding self-detection and payment of an associated fine will now be described with reference to FIG. 1.

For the purpose of illustration, it is assumed that the method is performed at least in part using an on-board processing device such as a user client device or vehicle processing device. The user client device may include a mobile phone such as a smartphone, portable computer, tablet computer or the like whilst the vehicle processing device may be an in-built vehicle computer system. The on-board processing device may be connected to a merchant processing device that may include any suitable processing system, such as a computer system, server(s), personal computer, or the like, via a network architecture, as will be described in more detail below. The merchant processing device is typically in communication with a payment processing system which may include a number of processing devices associated with each of an issuer, acquirer, card network and payment service provider, or alternatively, the payment processing system may be any one or more of these entities and this will be discussed further below. It is to be further appreciated that the method may be performed at least in part by the merchant processing device such that implementation is divided between the on-board processing device and merchant processing device.

Throughout the following, whilst specific reference is made to a merchant, it should be understood that the term is illustrative only and not intended to be limiting. Typically, the merchant will be a government agency or the like, which administers speed limits and fines motorists who commit speeding offences.

In this example, at step 100 the on-board processing device determines a speed indication indicative of the speed of the vehicle operated by a user. The on-board processing device may determine the speed indication in any suitable way, including for example by use of a positioning system (such as the Global Positioning System (GPS)) or electronic speedometer which uses magnetic sensors to measure rotation of the driveshaft.

At step 110, a speed limit indication indicative of a speed limit associated with a location of the vehicle with respect to a road network is then determined. This step may be performed in the on-board processing device or in a merchant processing device such as a merchant or government agency server, which may be cloud based. In this step, the location or position of the vehicle derived for example from a positioning system is associated with a position with respect to a road network (such as a street, road, area etc.). The road network information will typically be provided in the form of a map which may be stored locally in the on-board processing device or obtained from or stored in the merchant processing device or database associated therewith. Each position in the road network will typically have an associated speed limit that can be ascertained when the location of the vehicle is determined with respect to the road network.

At step 120, the method includes determining if the speed of the vehicle exceeds the speed limit using the speed indication and the speed limit indication. The comparative calculation may be performed by the on-board processing device or alternatively by the merchant processing device.

In response to determining that the speed limit has been exceeded, at step 130, the method further includes, determining payment information at least partially indicative of a payment amount representing a discounted fine for exceeding the speed limit. Typically, this step will be performed by the merchant processing device which determines a fine in accordance with the speed of the vehicle over the speed limit, which may be a fine prescribed by regulations or the like. A discount is then applied to this fine so that the user is fined an amount less than the regulatory fine for committing the speeding offence so as to provide an incentive for using the self-detection system. Alternatively, the on-board processing device may be configured to determine the discounted fine in accordance with locally stored data indicative of fine amounts for various speeding offences.

Having determined the payment information, at step 140 user account information associated with an account of the user is determined. The user account information may be indicative of a payment card or bank account of the user and may be associated with a mobile application executing on the user client device. The user account information may be stored in a digital payment wallet linked to the mobile application. Typically, the merchant processing device will retrieve the account information from the user client device, for example from the digital payment wallet.

At step 150, the account information and payment information is provided to a payment processing system to thereby cause the discounted fine to be paid from the user account. Typically, this step is performed by the merchant processing device which is configured to handle payment transactions with the payment processing system, comprising for example a payment service provider, acquirer, card network and issuer. In other implementations, the on-board processing system, for example the user client device, may interface directly with the payment processing system to cause the discounted fine to be paid from the user account. In at least one example, the above method causes the discounted fine to be paid automatically from the user account once a speeding offence has been detected.

Accordingly, it will be appreciated that at least in one example, the above described process provides a number of advantages. By moving the burden of speeding detection and enforcement to the end-user (i.e. the driver), substantial cost savings can be made by government agencies, police and the like who were previously responsible for carrying out these tasks. For example, government agencies will no longer be required to purchase, install, maintain or monitor equipment such as speed cameras and radars designed to detect drivers speeding.

From an administrative perspective, there would be additional savings in no longer having to administer fines to users and chase up whether fines have been paid, as the fine is deducted automatically from the user's account. In addition to monetary benefit, there would also be a human resources gain as agency employees, police officers and the like would be freed up to perform other tasks.

As a user would provide consent to self-regulate their own driving behaviour and be fined if they commit a speeding offence, it is likely that over time, motorists attitudes towards speeding will change, which may lead to an overall reduction in speeding and in turn, accidents and road fatalities caused by speeding.

From a driver's perspective, they would be incentivised to use the system by receiving discounted fines when they are found to be speeding. This will significantly ease the financial burden on motorists of having to pay hefty fines, thereby encouraging them to use the system and in turn leading to greater awareness of speeding in the community.

A number of further features will now be described.

In one example, the speed indication is determined using location information derived from a positioning system. Typically, the positioning system will be a global satellite system enabling the position of the vehicle and time to be determined to within an accuracy of several metres and nanoseconds respectively. From this, the vehicle speed can be derived from known techniques as will be well understood in the art. In one example, the positioning system is the Global Positioning System (GPS) and the on-board processing device includes a GPS receiver. The GPS receiver may be an in-built unit in a user client device such as a smartphone or tablet or alternatively it may be an in-built vehicle GPS unit. When GPS is used, the indication of vehicle speed may be determined using known techniques for deriving speed from GPS data including for instance location information (latitude/longitude measurements), time and Doppler shift.

If an in-built vehicle GPS unit is used to determine a speed indication, the GPS unit will typically be configured to communicate with a user client device to enable the speed indication to be provided, for example to a mobile application executing on the user client device. As most smartphones are typically provided with GPS capabilities, the user of a smartphone or the like to determine vehicle speed is advantageous as it is able to leverage off of existing hardware in the device.

As previously mentioned, the on-board processing device used to determine the speed indication may include any suitable processing device located within the vehicle as it is travelling. This may include a device permanently installed in the vehicle or a mobile device carried by the user. Accordingly, the on-board processing device may be a user client device or a vehicle processing device, for example comprising or including an in-built vehicle GPS unit. In some examples, the system may include both a user client device and a vehicle processing device operable to perform certain steps of the method.

In one example, the user client device receives the speed limit indication from a merchant processing device via a communications network. In this example, the user client device would then compare the vehicle speed with the speed limit to determine if the vehicle is speeding. Alternatively, the user client device may provide the speed indication to the merchant processing device, which then determines the speed limit indication and compares the vehicle speed to the speed limit. It is to be understood therefore, that the determination of the speed limit and whether the vehicle is speeding may be performed by either the user client device or the merchant processing device depending on the preferred implementation.

In one example, the user client device determines location information indicative of the location of the vehicle, for example using GPS or the like. The location information will typically be in the form of latitude and longitude coordinates. The user client device then provides an indication of the location information to the merchant processing device which is responsive to receiving the location information to determine road network information based on the location information. The user client device then receives an indication of the road network information from the merchant processing device.

The road network information may be at least partially indicative of at least one of a road network map and a speed limit indication. In this regard, the user client device typically retrieves a road network map including speed limit information from the merchant processing device and then compares the latitude and longitude coordinates with a corresponding point on the map to determine the location of the vehicle with respect to the road network. Having determined this location (for example a street, road, area or position along a route), the corresponding speed limit can be determined. In an alternative example, the user client device may obtain the road network information including the speed limit indication from a map or similar stored locally by the on-board processing device (such as an in-vehicle GPS unit). In yet a further example, the merchant processing device may access a road network map and determine the location of the vehicle with respect to the road network in accordance with the GPS coordinates provided by the user client device to allow the speed limit to be determined.

In one example, the method further includes, in the user client device, in response to determining that the speed limit has been exceeded, providing a speeding indication to the merchant processing device. In this example, it is assumed that a mobile application or similar executing on the user client device is configured to determine whether the vehicle is speeding and to communicate this information to the merchant processing device. The speeding indication may be at least partially indicative of the amount by which the vehicle speed exceeds the limit.

In this example, the merchant processing device receives the speeding indication from the user client device and uses the speeding indication to determine a speeding offence at least partially based on an amount by which the vehicle speed exceeds the speed limit, and, a regulatory fine at least partially in accordance with the speeding offence. The regulatory fine information may be determined from a database or the like which stores information relating to speeding offences and associated penalties prescribed by law of various states, territories, regions, countries etc. The payment amount representing the discounted fine is then determined, the payment amount being an amount less than the regulatory fine so as to incentive the user be self-regulated and fined for speeding. The discount applied may vary depending on the speeding offence that has been committed and for example, the severity thereof.

Having determined the payment amount, the method further includes, in the merchant processing device, retrieving the account information associated with the user account from the user client device, and providing the account information and payment information to the payment processing system to thereby cause the discounted fine to be paid from the user account. In one example, the user account is associated with a digital wallet component installed on the user client device which is accessible by the merchant processing device to obtain payment card or bank account details of the user. It should be appreciated that the digital wallet component can be, for example, a dedicated wallet app, a component of an app which enables wallet functionality, and so forth, Typically, to enable the payment process to be performed automatically and seamlessly without involvement of the user, the user account is pre-authenticated with the payment processing system so that the merchant processing device is able to cause the discounted fine to be paid from the user account without further authentication. In one example, a default payment card may be pre-authenticated with an issuer business-as-usual (BAU) and a mobile application executing on the user client device may be updated with user account validation.

After a user has been fined for speeding, the merchant processing device may generate a notification that the user has been fined, and provide the notification to the user client device. The user client device may responsive to receiving the notification to generate a representation of the notification and cause the representation to be displayed to the user. In this way, the user is informed that they were speeding and have been fined in real-time which may assist in making drivers more attentive to their speed and encouraging them to change their driving behaviours. This is contrasted with existing systems whereby drivers often aren't aware that they have been caught speeding and will not typically receive a fine until several weeks after the offence has been committed. In this way, drivers are provided with an instantaneous penalty for their actions which may cause them to pay closer attention to their speed as they will be deterred from wanting to attract a further fine.

Whilst a driver may be fined as soon as they go above a designated speed limit, typically, a warning may be provided first to alert the driver to slow down and thereby self-regulate their speed. The method may therefore further include generating a notification indicative of a warning that the user has exceeded the speed limit. The on-board processing device may then generate a representation of the notification and display the representation to the user. In one example, a visual warning notification may be provided, however alternatively an audible warning may be provided or a combination of both. Any number of warnings may be provided depending on the preferred implementation. The speed at which a warning is triggered may also vary and in one example may be approximately 3 kmph over the limit.

To verify or confirm that the user is in their vehicle, the method further includes initially pairing the user client device with a vehicle processing device for example via a wireless communication protocol such as Bluetooth. Subsequent pairing between the user client device and the vehicle processing device is performed automatically in response to vehicle ignition. After the devices have been paired, it is assumed that the user is in their vehicle which will cause the system to be used so as to monitor the vehicle's speed and cause a fine to be issued as appropriate in accordance with the above-described method.

It will be appreciated that the above-described method may be performed by a system for vehicle speeding self-detection and payment of an associated fine. The system may include an on-board processing device for determining a speed indication indicative of the speed of the vehicle operated by a user. The system may further include one or more electronic processing devices for determining a speed limit indication indicative of a speed limit associated with a location of the vehicle with respect to a road network and determining if the speed of the vehicle exceeds the speed limit using the speed indication and the speed limit indication. In response to determining that the speed limit has been exceeded, the one or more electronic processing devices determine a payment amount indicative of a discounted fine for exceeding the speed limit and cause the payment amount to be paid from an account of the user.

The on-board processing device may be a user client device such as a smartphone or a vehicle processing device. The one or more electronic processing devices include one or more of the on-board processing device and a merchant processing device.

In one example, the on-board processing device includes a GPS receiver for determining location information used to calculate the speed of the vehicle. The GPS receiver may be an in-built receiver of a smartphone or the like or alternatively an in-built unit of a vehicle having a satellite navigation system or similar.

Typically, a digital wallet application is installed on the user client device, the digital wallet application storing account information associated with the user account. The digital wallet application is typically associated with a mobile application executing on the user client device which is configured to perform various steps of the method.

In one configuration, the system for vehicle speeding self-detection and payment of an associated fine includes a user client device located on-board the vehicle for determining a speed indication indicative of the speed of the vehicle operated by a user using location information derived from a positioning system, retrieving a speed limit indication indicative of a speed limit from a merchant server via a communications network, the speed limit associated with a location of the vehicle with respect to a road network, determining if the speed of the vehicle exceeds the speed limit using the speed indication and the speed limit indication, and, in response to determining that the speed limit has been exceeded, providing a speeding indication to the merchant server. The system further includes a merchant server for receiving the speeding indication from the user client device, using the speeding indication to determine a speeding offence at least partially based on an amount by which the vehicle speed exceeds the speed limit and, a regulatory fine at least partially in accordance with the speeding offence. The merchant server is further for determining payment information indicative of a payment amount representing a discounted fine being an amount less than the regulatory fine, retrieving account information associated with an account of the user from a digital wallet application installed on the user client device, and providing the account information and payment information to a payment processing system to thereby cause the discounted fine to be paid from the user account.

Figure 2:
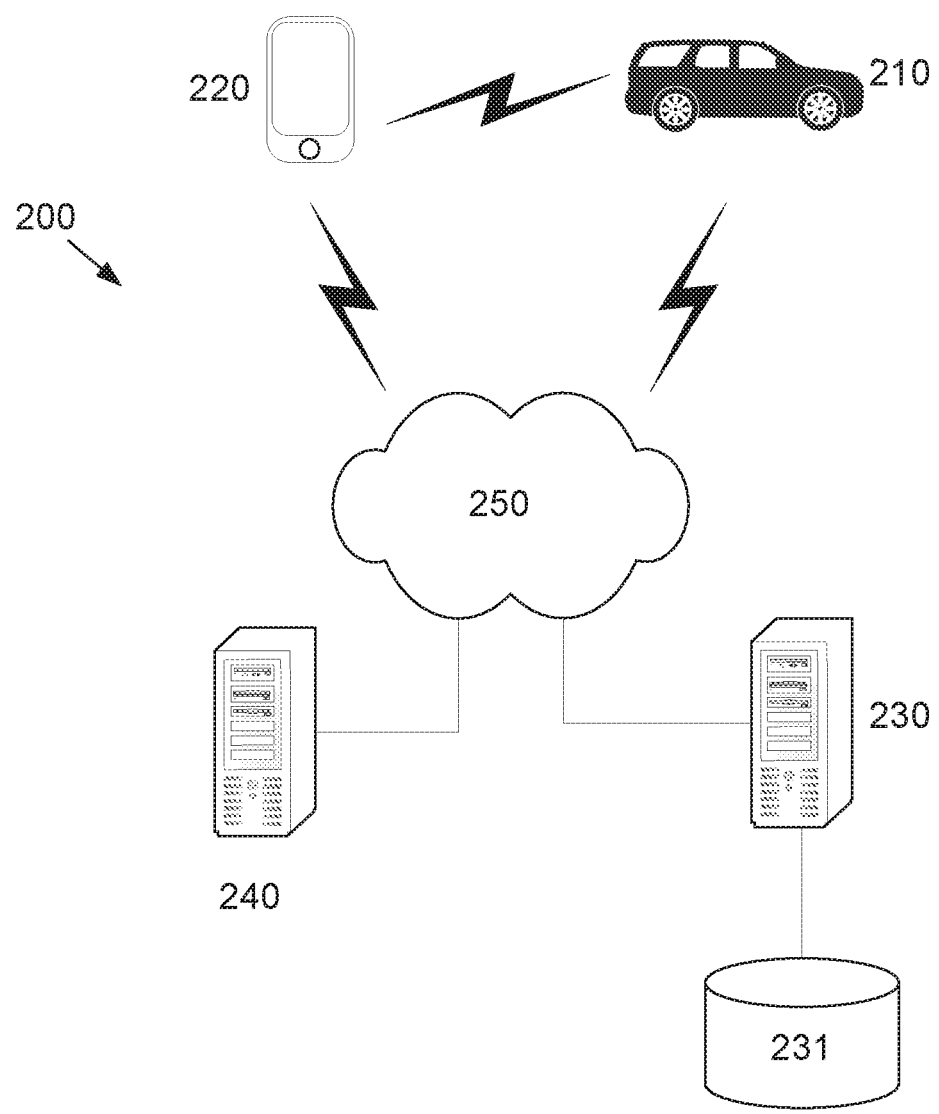
FIG. 2 is a schematic diagram of an example of a system for vehicle speeding self-detection and payment of an associated fine.

An example of a system for vehicle speeding self-detection and payment of an associated fine will now be described with reference to FIG. 2.

In this example, the system 200 includes a vehicle processing device 210, a user client device 220 running a merchant application and a payment application or payment component such as a digital payment wallet, a communications network 250, a merchant processing device 230 in communication with a database 231, and a payment processing device 240.

The communications network 250 can be of any appropriate form, such as the Internet and/or a number of local area networks (LANs) for providing connectivity between the merchant processing device 230, user client device 220, payment processing device 240 and optionally the vehicle processing device 210. It will be appreciated that this network configuration is for the purpose of example only, and in practice the various devices can communicate via any appropriate mechanism, such as via wired or wireless connections, including, but not limited to mobile networks, private networks, such as an 802.11 network, the Internet, LANs, WANs, or the like, as well as via direct or point-to-point connections, such as Bluetooth, or the like.

In one example, the merchant processing device 230 includes one or more processing systems, each of which may be coupled to one or more databases 231. The merchant processing device 230 is adapted to be used in receiving requests from and responding to the user client devices. The user client devices 203 are typically adapted to communicate with the merchant processing device 230, allowing requests to be made and responses to be received. The merchant processing device 230 may also be adapted to implement payment services, or be connected to a payment processing system 240, such as servers of financial institutions, payment gateways or the like, as will be appreciated by persons skilled in the art.

Whilst the merchant processing device 230 is a shown as a single entity, it will be appreciated that the merchant processing system can be distributed over a number of geographically separate locations, for example by using processing systems and/or databases 231 that are provided as part of a cloud based environment. However, the above described arrangement is not essential and other suitable configurations could be used.

User Client Device 220

Figure 3:
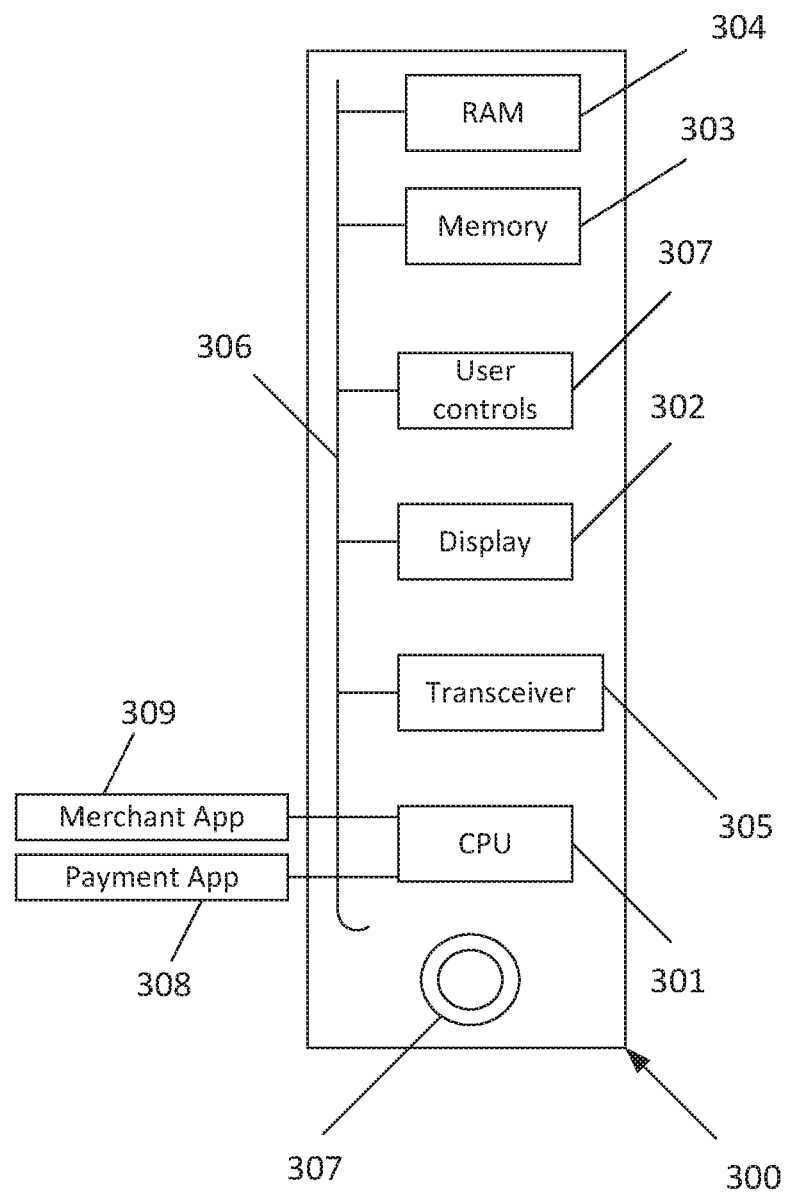
FIG. 3 is a schematic diagram of an example of a user client device of the system shown in FIG. 2.

The user client device 220 of any of the examples herein may be a handheld computer device such as a smart phone or a PDA such as one manufactured by Apple™, LG™, HTC™, Research In Motion™, or Motorola™. The user device 220 may include a mobile computer such as a tablet computer. An exemplary embodiment of a user client device 300 is shown in FIG. 3. As shown, the device 300 includes the following components in electronic communication via a bus 306:

1. a display 302;
2. non-volatile memory 303;
3. random access memory ("RAM") 304;
4. N processing components 301;
5. a transceiver component 305 that includes N transceivers; and
6. user controls 307.

Although the components depicted in FIG. 3 represent physical components, FIG. 3 is not intended to be a hardware diagram; thus many of the components depicted in FIG. 3 may be realized by common constructs or distributed among additional physical components. Moreover, it is certainly contemplated that other existing and yet-to-be developed physical components and architectures may be utilized to implement the functional components described with reference to FIG. 3.

The display 302 generally operates to provide a presentation of content to a user such as vehicle speed, speed limit and notification when a user has been fined, and may be realized by any of a variety of displays (e.g., CRT, LCD, HDMI, micro-projector and OLED displays). And in general, the non-volatile memory 303 functions to store (e.g., persistently store) data and executable code including code that is associated with the functional components of a browser component and applications, and in one example, a payment application 308 and merchant application 309 executing on the user device 300. In some embodiments, for example, the non-volatile memory 303 includes bootloader code, modem software, operating system code, file system code, and code to facilitate the implementation of one or more portions of the payment application 308 and merchant application 309 as well as other components well known to those of ordinary skill in the art that are not depicted for simplicity.

In many implementations, the non-volatile memory 303 is realized by flash memory (e.g., NAND or ONENAND memory), but it is certainly contemplated that other memory types may be utilized as well. Although it may be possible to execute the code from the non-volatile memory 303, the executable code in the non-volatile memory 303 is typically loaded into RAM 304 and executed by one or more of the N processing components 301.

The N processing components 301 in connection with RAM 304 generally operate to execute the instructions stored in non-volatile memory 303 to effectuate the functional components. As one of ordinarily skill in the art will appreciate, the N processing components 301 may include a video processor, modem processor, DSP, graphics processing unit (GPU), and other processing components.

The transceiver component 305 includes N transceiver chains, which may be used for communicating with external devices via wireless networks. Each of the N transceiver chains may represent a transceiver associated with a particular communication scheme. For example, each transceiver may correspond to protocols that are specific to local area networks, cellular networks (e.g., a CDMA network, a GPRS network, a UMTS networks), and other types of communication networks.

Vehicle Processing Device 210

Figure 4:
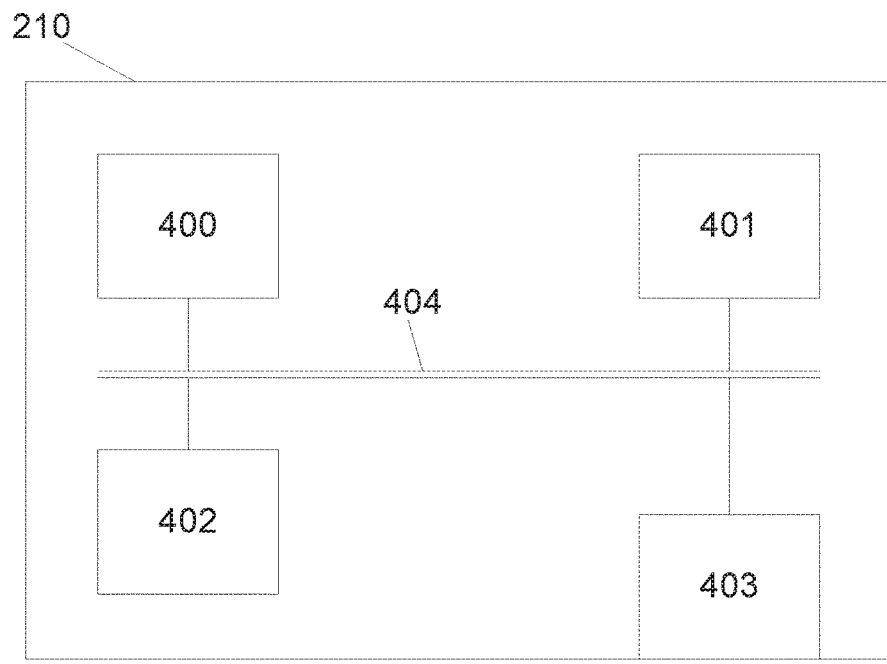
FIG. 4 is a schematic diagram of an example of a vehicle processing device of the system shown FIG. 2.

A suitable vehicle processing device for use in the system for vehicle speeding self-detection and payment of an associated fine described in anyone of the above examples is shown in FIG. 4.

In this example, the vehicle processing device 210 includes at least one microprocessor 400, a memory 401, an optional input/output device 402, such as a display, keyboard, touchscreen and the like, and an external interface 403, interconnected via a bus 404 as shown. In this example the external interface 403 can be utilised by the vehicle processing device 210 when communicating with peripheral devices, such as the user device 220, communications networks 250, merchant processing device 230, payment processing device 240, merchant processing device 240, databases, other storage devices, or the like. Although only a single interface 403 is shown, this is for the purpose of example only, and in practice multiple interfaces using various methods (e.g. Ethernet, serial, USB, wireless, Bluetooth™ Low Energy (BLE), Near Field Communication (NFC), or the like) may be provided.

In use, the microprocessor 400 executes instructions in the form of applications software stored in the memory 401 to allow communication with the user client device 220, for example to pair the devices via Bluetooth to confirm the user is in the vehicle or to provide the speed indication to the user client device 220. The applications software may include one or more software modules, and may be executed in a suitable execution environment, such as an operating system environment, or the like.

Accordingly, it will be appreciated that the vehicle processing device 210 may be formed from any suitable processing system, such as any electronic processing device, including a microprocessor, microchip processor, logic gate configuration, firmware optionally associated with implementing logic such as an FPGA (Field Programmable Gate Array), or any other electronic device, system or arrangement. Thus, in one example, the processing system 210 is a standard processing system such as an Intel Architecture based processing system, which executes software applications stored on non-volatile (e.g., hard disk) storage, although this is not essential.

Typically, the vehicle processing device 210 forms part of a computer system built-in or otherwise integrated with the vehicle and may optionally also include a GPS receiver for determining the speed of the vehicle. The vehicle processing device 210 may also be pre-loaded with road network maps for use in determining the location of the vehicle with respect to the road network so that the associated speed limit can be determined.

Merchant Processing Device 230

Figure 5:
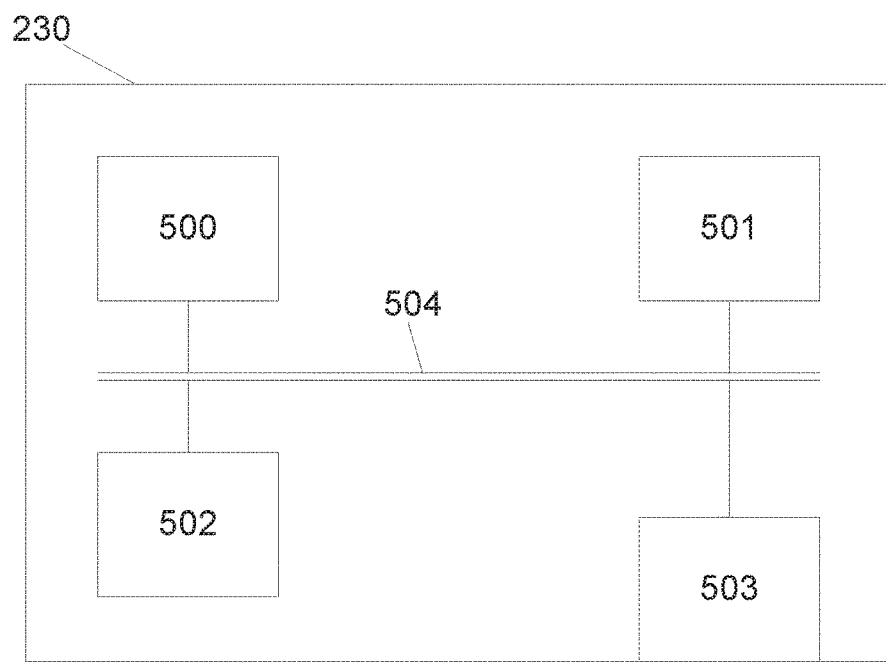
FIG. 5 is a schematic diagram of an example of a merchant processing device of the system shown in FIG. 2.

A merchant processing device for use in the system described in anyone of the above examples is shown in FIG. 5.

In this example, the merchant processing device 210 includes at least one microprocessor 500, a memory 501, an optional input/output device 502, such as a display, keyboard, touchscreen and the like, and an external interface 503, interconnected via a bus 504 as shown. In this example the external interface 503 can be utilised by the merchant processing device 210 when communicating with peripheral devices, such as the user client device 220, communications networks, payment processing device 240, optionally the vehicle processing device 210, databases, other storage devices, or the like. Although only a single interface 503 is shown, this is for the purpose of example only, and in practice multiple interfaces using various methods (e.g. Ethernet, serial, USB, wireless, Bluetooth™ Low Energy (BLE), Near Field Communication (NFC), or the like) may be provided.

In use, the microprocessor 500 executes instructions in the form of applications software stored in the memory 501 to allow communication with the user client device 220, for example to receive a speed or speeding indication and to provide road network information including a speed limit indication, and the payment processing device 230, for example to cause the discounted fine to be paid from the user account. The applications software may include one or more software modules, and may be executed in a suitable execution environment, such as an operating system environment, or the like.

Accordingly, it will be appreciated that the merchant processing device 230 may be formed from any suitable processing system, such as any electronic processing device, including a microprocessor, microchip processor, logic gate configuration, firmware optionally associated with implementing logic such as an FPGA (Field Programmable Gate Array), or any other electronic device, system or arrangement. However, the merchant processing device 230 may also be formed from a suitably programmed PC, Internet terminal, lap-top, or handheld PC, a tablet, or smart phone, or the like. Thus, in one example, the processing system 230 is a standard processing system such as an Intel Architecture based processing system, which executes software applications stored on non-volatile (e.g., hard disk) storage, although this is not essential.

Figure 6A:
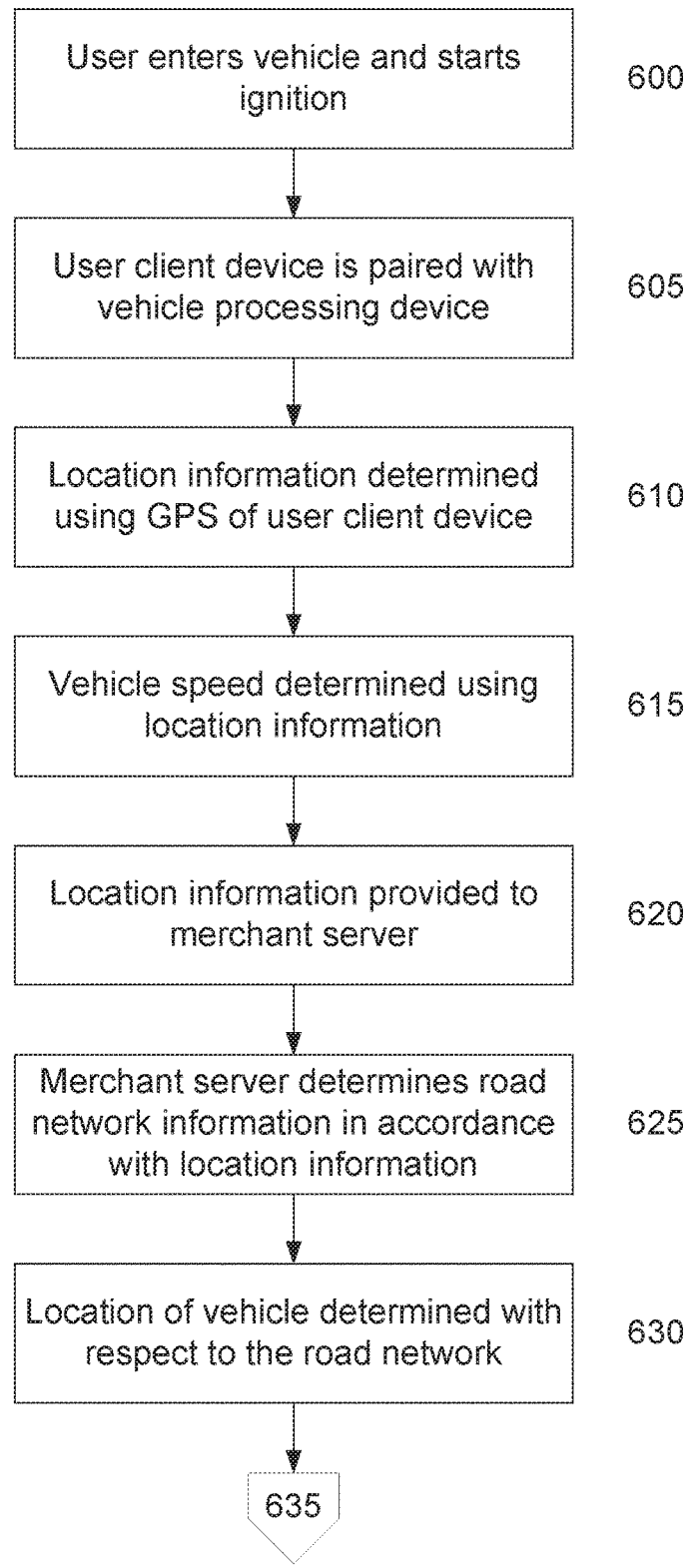
FIGS. 6A, 6B and 6C are a flow chart of an example of a method of vehicle speeding self-detection and payment of an associated fine.
Figure 6B:
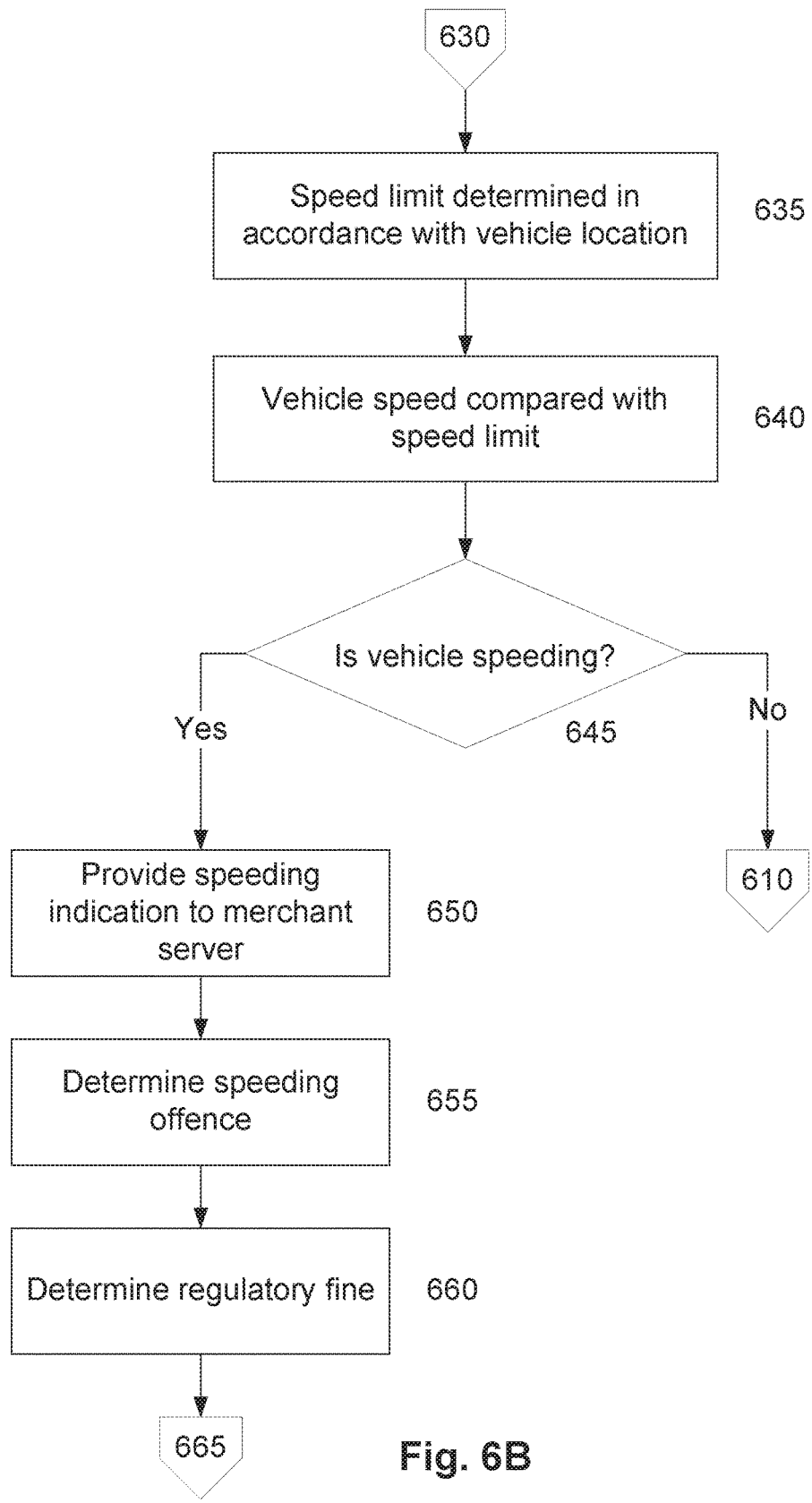
Figure 6C:
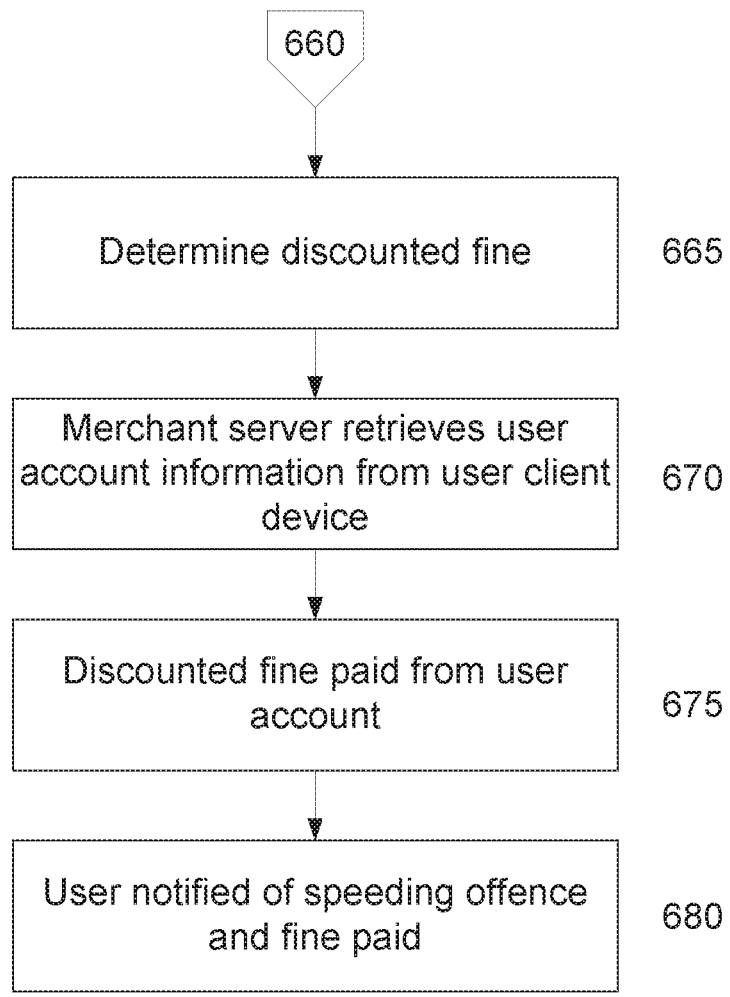

An example of a process for vehicle speeding self-detection and payment of an associated fine will now be described in more detail with reference to FIGS. 6A to 6C.

In this example, at step 600 the user enters their vehicle and starts the ignition. This provides power to the vehicle processing device 210 which is automatically paired to the user client device 220 via a Bluetooth connection at step 605. This pairing is used to confirm that the user is in their vehicle and provides a means of authenticating the user.

As the user begins to drive, at step 610, location information is determined using GPS of the user client device 220. In other examples, as previously mentioned, location information could be derived from an in-built vehicle GPS unit and provided to the user client device. The location information is then used to determine the speed of the vehicle at step 615 using known techniques familiar to persons skilled in the art. This location information is provided to the merchant server 230 at step 620. The merchant server 230 is responsive to receiving the location information in the form of GPS latitude and longitude coordinates to determine road network information in accordance with the location information at step 625. The merchant server 230 may retrieve a road network map or the like from a database 231 or other data store and provide this information to the user client device 220. The road network information typically also includes speed limit information associated with roads, areas or routes designated on the map.

At step 630, the location of the vehicle with respect to the road network is then determined by the user client device 220 by comparing the GPS coordinates with the road network map obtained from the merchant server 230. The speed limit may then be determined in accordance with the vehicle location at step 635 and compared against the vehicle speed at step 640 in order to determine if the vehicle is speeding.

At step 645, the user client device 220 determines if the vehicle is speeding and if the vehicle speed is less than the speed limit, the process returns to step 610 and the speed monitoring process resumes. If however the vehicle is determined to be speeding, then at step 650 the user client device 220 provides a speeding indication to the merchant server 230 which may include for example the speed indication and speed limit indication.

The merchant server 230 then determines the speeding offence at step 655 using the speed and speed limit indication and speeding offence information that may be stored in database 231 for example. An example speeding offence may be "exceeding the speed limit between 0-10 kmph" or "exceeding the speed limit between 10-20 kmph in a school zone". Having determined the speeding offence, the merchant server 230 at step 660 then determines what the regulatory fine is for the particular speeding offence. This may be a fine prescribed by relevant state or national legislation governing road laws and rules.

At step 665, the merchant server 230 determines a discounted fine payable by the user for committing the speeding offence. The discounted fine represents an amount less than the regulatory fine so that an incentive is provided to the user to consent to self-regulate their own speeding and agree to payment of fines. The discount applied may be dependent on the severity of the offence with a greater discount possibly applicable for minor offences.

The merchant server 230 then retrieves user account information from the user client device 220. The user account information may be indicative of a user's bank account or payment card nominated for use by the user. Typically, the account information is stored in a digital payment wallet executing on the user client device 220, the payment wallet configured to provide the account information to the merchant server 230 either directly or more typically via a merchant application running on the client device 220.

At step 675, the discounted fine is paid from the user account. Typically this is achieved via communication between the merchant server 230 and the payment processing system 240. The payment is processed in any suitable manner via request and response messages, for example in a four-party (open) scheme between the merchant server 230, an acquirer system, card network, issuer system and optionally a payment service provider such as payment gateway; or in a three-party (closed) scheme between the merchant server 230, a payment network (acting as both issuer and acquirer) and typically, a payment gateway.

Typically, at step 680 the user is then notified of the speeding offence and fine paid via a notification displayed on the user client device 220. In this way, it is envisaged that the system will help to stimulate better behaviour on the road as user's are provided penalties for speeding very shortly after the offence is committed.

Figure 7:
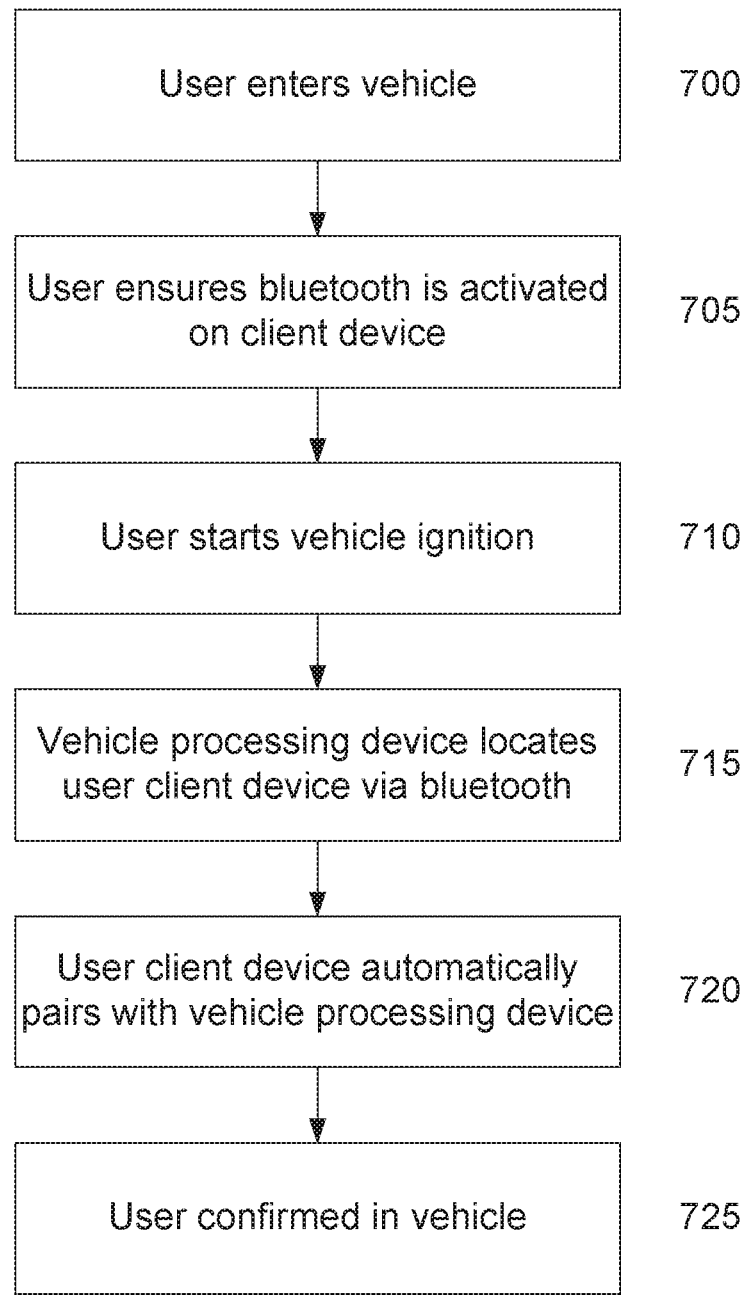
FIG. 7 is a flowchart of an example of a method of confirming that a user is in the vehicle.

An example of a process for confirming that a user is in their vehicle will now be described in more detail with reference to FIG. 7.

In this example, at step 700 the user enters their vehicle carrying a user client device such as smartphone having Bluetooth connectivity. At step 705, the user ensures that Bluetooth is activated so that other devices may be found.

At step 710, the user starts the vehicle ignition which provides power to a vehicle processing device 210 also having Bluetooth connectivity. In one example, the vehicle processing device includes a beacon transmitter which acts as a one-way transmitter to the receiving user client device. At step 715, the vehicle processing device 210 locates the user client device 220 and at step 720 the devices are automatically paired together.

This pairing of devices provides a method of authenticating that the user is the person who has consented to being monitored and fined while driving while also confirming that the user is in the vehicle at step 725. Once this has been confirmed, the merchant application running on the user client device 220 will begin monitoring the speed of the vehicle.

Figure 8:
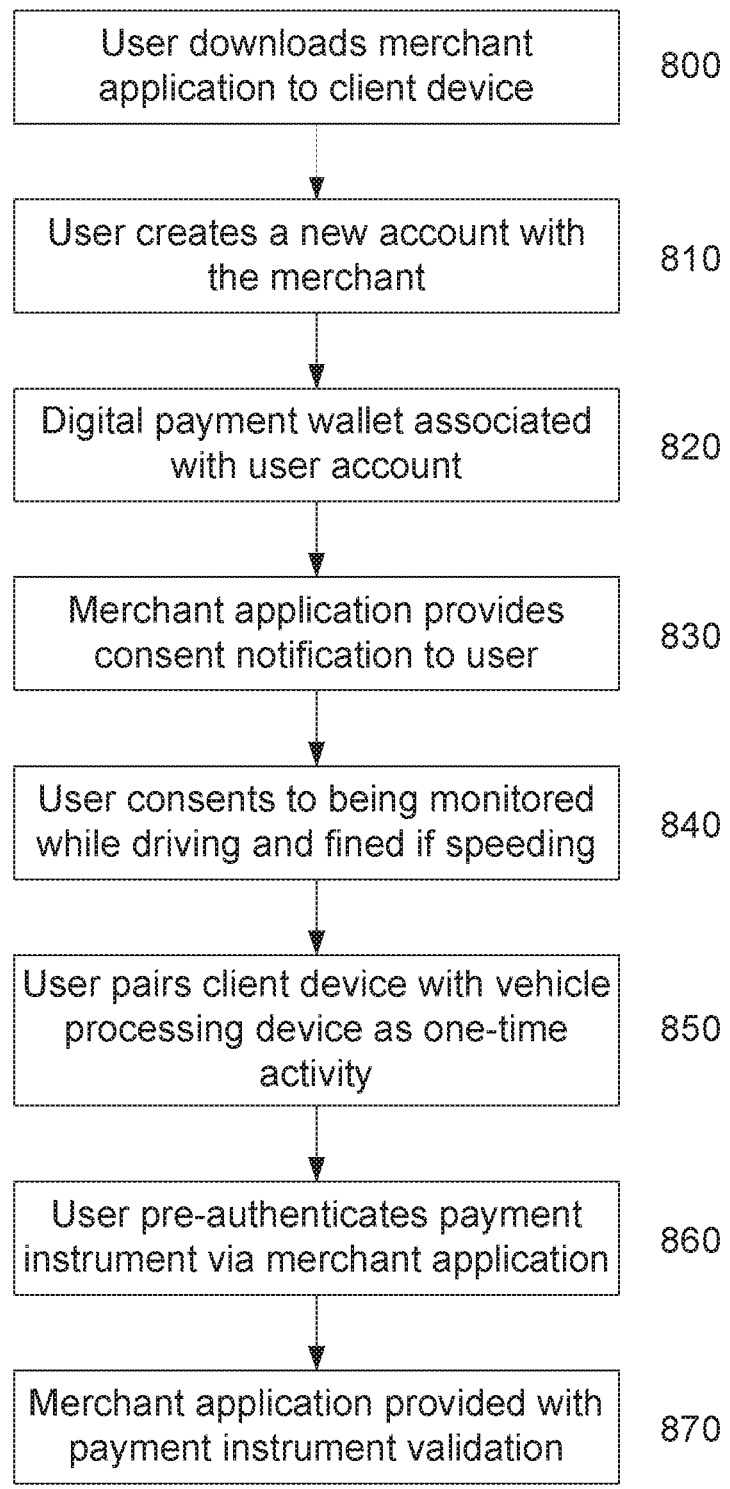
FIG. 8 is a flowchart of an example of a method of account setup with a merchant before the system is used; and, FIG. 9 is a specific example of a method and system for vehicle speeding self-detection and payment of an associated fine.

An example of a process for account setup with a merchant before the system is used will now be described in more detail with reference to FIG. 8.

In this example, at step 800, the user downloads a merchant application to their client device, such as a smartphone. The merchant application is for monitoring the speed of the vehicle and automatically fining the user for speeding.

At step 810, the user creates a new account with the merchant for example providing their name, address, vehicle registration and bank account or payment card details. Typically, the bank or payment card details are provided by associating or linking a digital payment wallet with or to the user account. Any suitable digital payment wallet may be used including for example Google Wallet™, Apple Pay™, Masterpass™ and the like.

At step 830, the merchant application then provides a consent notification to the user requesting that the user provide their consent to participate in the self-regulation scheme. At step 840, the user provides input to the merchant application indicative of their consent to being monitored while driving and fined if speeding.

As a one-time activity, the user then pairs their client device 220 with the vehicle processing device 210 at step 850. This is a manual pairing whereby the user's device picks up the Bluetooth signal emitted by a beacon or other form of transmitted associated with the vehicle processing device 210 and the user selects to pair with the vehicle processing device 210. Subsequent device pairing upon start of the ignition are performed automatically without user input.

At step 860, the user pre-authenticates their payment instrument (i.e. payment card or bank account details) with the payment processing system via the merchant application which is in communication with the merchant server 230. Pre-authentication with the issuer is performed business-as-usual (BAU) and involves the user authenticating that the payment instrument belongs to them and providing permission for the payment instrument to be charged by the merchant server.

The merchant application is then updated and provided with the payment instrument validation at step 870 so that future payments can be processed automatically without further input or authentication from the user being required. The user's account with the merchant is now setup and ready for use.

Figure 9:
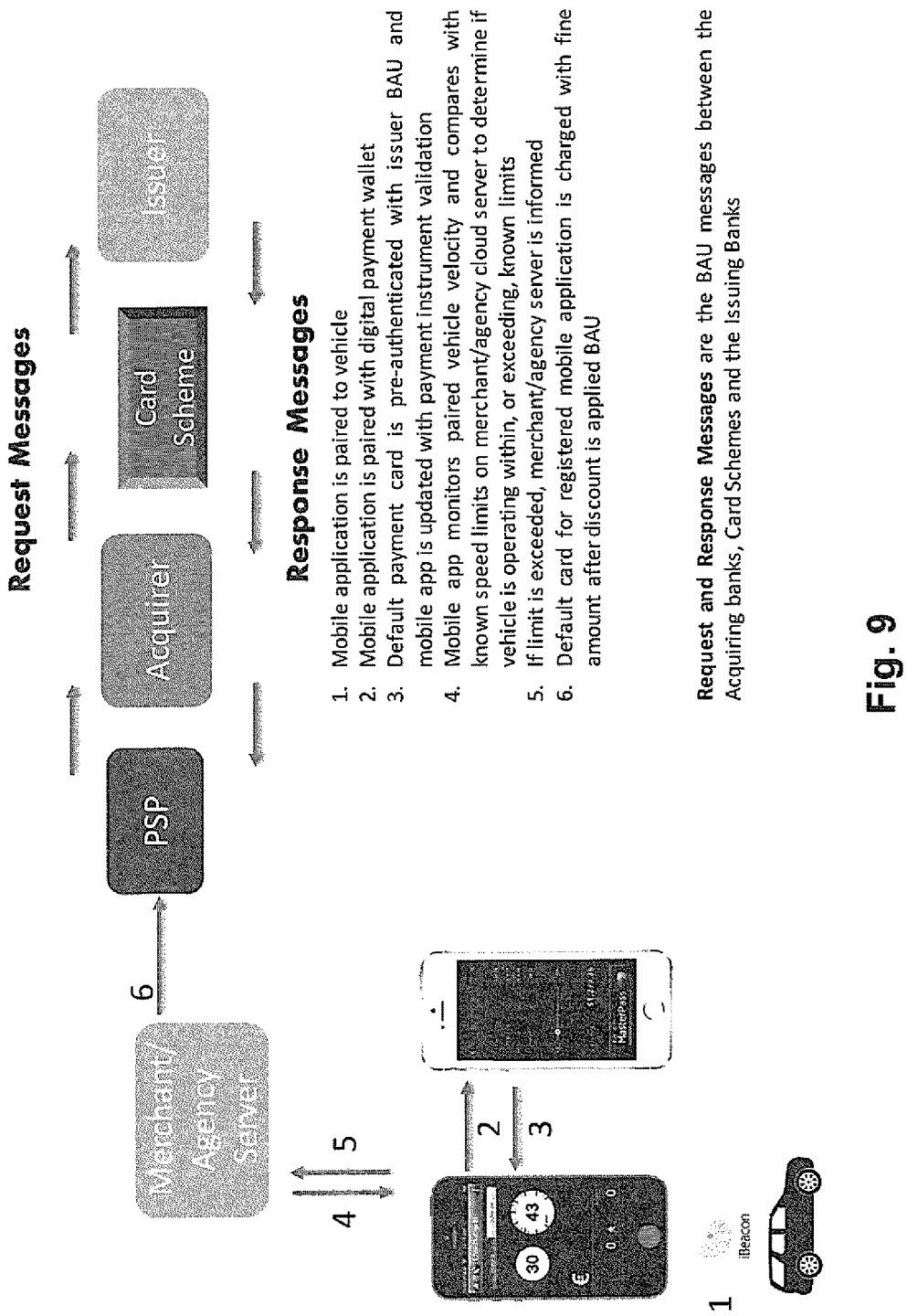

Referring now to FIG. 9, there is shown a specific implementation of a system for vehicle speeding self-detection and payment of an associated fine. In this system, a mobile application executing on a smartphone is paired to the vehicle via Bluetooth. The mobile application is also paired with a digital payment wallet containing user account information such as payment card information. The default payment card is pre-authenticated with an issuer BAU and the mobile application is updated with payment instrument validation.

In use, the mobile application monitors the speed of the paired vehicle using GPS and compares with known speed limits obtained from a merchant/agency cloud server to determine if the vehicle is operating within, or exceeding, known limits. If the speed limit is exceeded, the merchant/agency server is informed and the default payment card for the registered mobile application is charged with a discounted fine.

Accordingly, it will be appreciated that in at least one example the above described method and system provides an alternative way to enforce road laws via a user monitoring their own speed and consenting to receive a discounted fine if found to be speeding. This has the potential to significantly reduce government agency expenses that have traditionally been incurred in purchasing, installing, maintaining and monitoring equipment designed to detect users exceeding speed limits, while also reducing the cost of administration in issuing fines and chasing up unpaid fines. By creating a system of self-regulation, users may be encouraged to pay closer attention to their speed so as to avoid being fined which may lead to a change in driver behaviour and attitudes toward speeding.

During transition to widespread adoption of the above described system, it is envisaged that the system would complement existing monitoring and enforcement strategies including use of traditional speed cameras and radars. In such an environment, motorists using the above described system would be recognised (for example through their vehicle registration) such that they aren't fined for the same offence twice. However, if a motorist that has consented to use the system is not travelling with their smartphone or the like running the merchant application then they would be fined in the traditional manner and a merchant server or the like would detect that the system is not currently is use.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

Persons skilled in the art will appreciate that numerous variations and modifications will become apparent. All such variations and modifications which become apparent to persons skilled in the art, should be considered to fall within the spirit and scope that the invention broadly appearing before described.

The invention claimed is:

1. A method for on-board detection of speeding of a vehicle and payment of an associated fine by an on-board processing device operably connected to a merchant processing device via a communications network, the on-board processing device including a positioning system and a digital wallet component, the method comprising, subsequent to pre-authentication of a payment account of a user associated with the digital wallet component with a payment processing device:
   determining, by the on-board processing device, a speed indication indicative of the speed of the vehicle operated by a user using location information derived from the positioning system;
   retrieving, by the on-board processing device from the merchant processing device via the communications network, a speed limit indication indicative of a speed limit associated with a location of the vehicle with respect to a road network;
   determining, by the on-board processing device, whether the speed of the vehicle exceeds the speed limit using the speed indication and the speed limit indication;
   in response to determining that the speed limit has been exceeded, providing, by the on-board processing device, the speed indication to the merchant processing device via the communications network,
      wherein the merchant processing device determines payment information at least partially indicative of a payment amount representing a discounted fine for exceeding the speed limit;
      retrieves user account information associated with the pre-authenticated payment account of the user from the digital wallet component; and
      provides the user account information and the payment information to the payment processing device causing the discounted fine to be paid from the pre-authenticated payment account of the user.

2. The method according to claim 1, wherein the on-board processing device is one of:
   a) a user client device; and,
   b) a vehicle processing device.

3. The method according to claim 2, further comprising:
   determining, by the user client device, location information indicative of the location of the vehicle;
   providing, by the user client device via the communications network, the location information to the merchant processing device, wherein the merchant processing device determines road network information-based on the location information; and, receiving, by the client device via the communications network from the merchant processing device, an indication of the road network information.

4. The method according to claim 3, wherein the road network information is at least partially indicative of at least one of a road network map and the speed limit indication.

5. The method according to claim 1, wherein the on-board processing device is a user client device, and wherein the merchant processing device:
   receives the speeding indication from the user client device;
   determines using the speeding indication:
      a speeding offence at least partially based on an amount by which the vehicle speed exceeds the speed limit; and,
      a regulatory fine at least partially in accordance with the speeding offence; and,
   determines the payment amount representing the discounted fine, the payment amount being an amount less than the regulatory fine.

6. The method according to claim 5, wherein the merchant processing device:
   retrieves the account information associated with the user payment account from the user client device; and,
   provides the account information and payment information to the payment processing device to thereby cause the discounted fine to be paid from the user payment account.

7. The method according to claim 6, wherein the merchant processing device:
   generates a notification that the user has been fined; and,
   transmits the notification to the user client device.

8. The method according to claim 7, wherein the method further comprises:
   generating, by the user client device, a representation of the notification; and,
   displaying, by the user client device, the representation of the notification to the user.

9. The method according to claim 1, wherein the on-board processing device is a user client device that is:
   initially paired with a vehicle processing device by the user; and,
   subsequently paired with the vehicle processing device automatically in response to vehicle ignition, the pairing confirming that the user is operating the vehicle.

10. The method according to claim 9, wherein the user client device is paired with the vehicle processing device using a wireless communication protocol.

11. The method according to claim 1, wherein the method further includes:
   generating, by the on-board processing device, a notification indicative of a warning that the user has exceeded the speed limit;
   generating, by the on-board processing device, a representation of the notification; and,
   displaying, by the on-board processing device, the representation to the user.

12. A system for on-board detection of speeding of a vehicle and payment of an associated fine, comprising:
   an on-board processing device of a user operably connected via a communications network to a merchant processing device of a merchant device; and
   wherein the on-board processing device comprises a positioning system and a memory storing a digital wallet component, and wherein the memory comprises processor executable instructions which when executed, subsequent to pre-authentication of a payment account of a user associated with the digital wallet component with a payment processing device, cause the on-board processing device to:
      determine a speed indication indicative of the speed of the vehicle operated by a user using location information derived from the positioning system;
      retrieve from the merchant processing device via the communications network, a speed limit indication indicative of a speed limit associated with a location of the vehicle with respect to a road network;
      determine whether the speed of the vehicle exceeds the speed limit using the speed indication and the speed limit indication; and
      in response to determining that the speed limit has been exceeded, provide the speed indication to the merchant processing device via the communications network;
   wherein the merchant processing device:
      determines payment information at least partially indicative of a payment amount representing a discounted fine for exceeding the speed limit;
      retrieves user account information associated with the pre-authenticated payment account of the user from the digital wallet component; and,
      provides the user account information and the payment information to the payment processing device causing the discounted fine to be paid from the pre-authenticated payment account of the user.

13. The system of claim 12, wherein the on-board processing device comprises a GPS receiver for determining location information.

14. The system of claim 12, wherein the on-board processing device is a user client device.

* * * * *